United States Patent
Kaehler

(10) Patent No.: US 11,691,274 B2
(45) Date of Patent: Jul. 4, 2023

(54) SOFTWARE COMPENSATED ROBOTICS

(71) Applicant: Sanctuary Cognitive Systems Corporation, Vancouver (CA)

(72) Inventor: Adrian Kaehler, Los Altos Hills, CA (US)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 17/728,910

(22) Filed: Apr. 25, 2022

(65) Prior Publication Data
US 2023/0018498 A1    Jan. 19, 2023

Related U.S. Application Data

(63) Continuation of application No. 16/237,721, filed on Jan. 1, 2019, now Pat. No. 11,312,012.

(51) Int. Cl.
*B25J 9/16* (2006.01)
*B25J 19/02* (2006.01)
*G06F 18/24* (2023.01)

(52) U.S. Cl.
CPC ............ *B25J 9/161* (2013.01); *B25J 9/1612* (2013.01); *B25J 9/1697* (2013.01); *B25J 19/023* (2013.01); *G06F 18/24* (2023.01)

(58) Field of Classification Search
CPC ........ B25J 9/161; B25J 9/1612; B25J 9/1697; B25J 19/023; G06F 18/24
See application file for complete search history.

(56) References Cited

U.S. PATENT DOCUMENTS

| | | | |
|---|---|---|---|
| 10,930,037 B2 * | 2/2021 | Namiki | G06F 18/41 |
| 2017/0252922 A1 * | 9/2017 | Levine | B25J 9/1612 |
| 2019/0283245 A1 * | 9/2019 | Levine | B25J 9/161 |
| 2020/0114506 A1 * | 4/2020 | Toshev | G06N 3/008 |
| 2020/0122321 A1 * | 4/2020 | Khansari Zadeh | B25J 9/1697 |

* cited by examiner

*Primary Examiner* — Kira Nguyen
(74) *Attorney, Agent, or Firm* — Thomas Mahon; Adenike Adebiyi

(57) ABSTRACT

A software compensated robotic system makes use of recurrent neural networks and image processing to control operation and/or movement of an end effector. Images are used to compensate for variations in the response of the robotic system to command signals. This compensation allows for the use of components having lower reproducibility, precision and/or accuracy that would otherwise be practical.

19 Claims, 3 Drawing Sheets

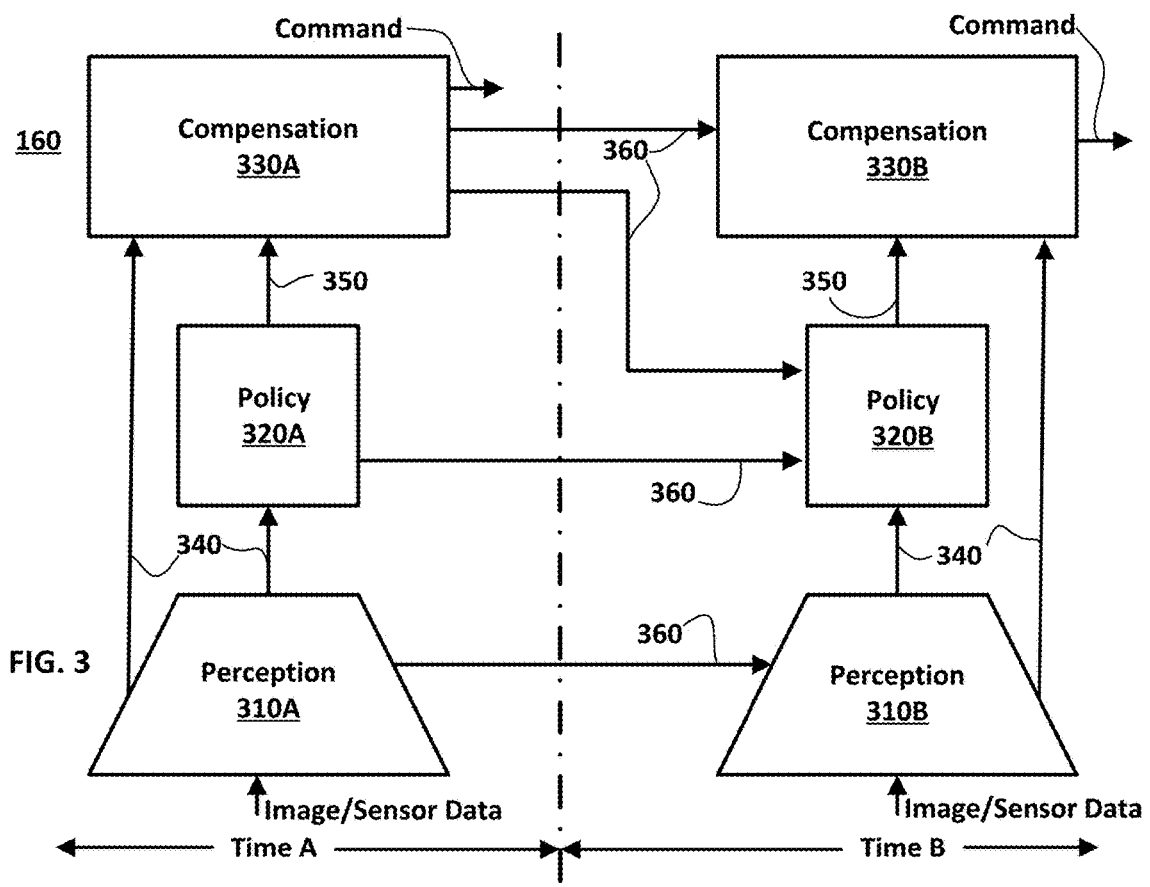
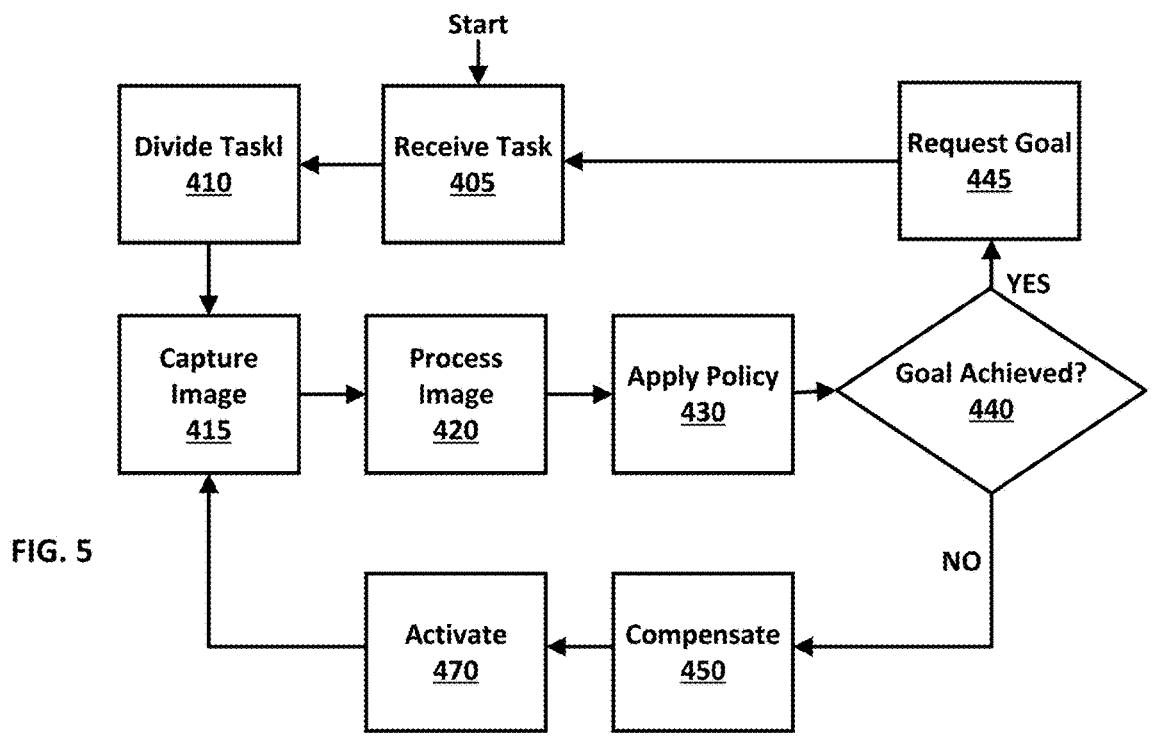

SOFTWARE COMPENSATED ROBOTICS

PRIORITY APPLICATIONS

The present application is a continuation of U.S. application Ser. No. 16/237,721 filed on Jan. 1, 2019, titled "Software Compensated Robotics", the disclosure of which is hereby incorporated by reference in its entirety.

BACKGROUND

Field of the Invention

The invention is in the field of robotics, and in some embodiments the field of vision-controlled robotics.

Related Art

Control of a robot typically involves sending an electronic signal and activating an actuator based on the electronic signal. The actuator can include a DC motor, hydraulic device, synthetic muscle, pneumonic device, piezoelectric, a linear or rotational actuator, or other movement generation device. The generated movement may be scaled up or down using a gear box or lever, and then used to move a part of the robot. The amount of movement is optionally detected using an encoder. The encoder and other components are optionally embodied in a servo motor or other actuator. A robot having multiple degrees of freedom, e.g., 6-degrees, typically require at least one movement generation device for each degree of freedom.

Reaching a desired "pose" for a robotic requires specification of both a location (x, y, z) and a set of angular values ($\alpha$, $\beta$, $\gamma$). Reaching a desired pose depends on knowing an existing pose of the robot and applying motion to six movement generation devices to move from the current pose to a desired pose. Such movement is typically achieved by using a target pose and a model of the robot to calculate a movement needed in each degree of freedom. The precision and accuracy of reaching the desired pose is dependent on inverse kinematics, which requires knowledge of the initial pose, accuracy of the model of the robot and precision of the movement. Achieving high precision and accuracy can require expensive components, particularly when heavy loads are involved. Requirements for precision and accuracy also preclude, in many applications, use of some types of movement generation devices which may change over time, such as tendon mechanisms. Finally, in many applications, use of some types of materials are precluded for use in robotics for similar reasons.

SUMMARY

Vision based robot control includes a real-time feedback loop which compensates for variations in actuator response and/or models of the robot using data collected from cameras and other input devices. Images of actual robot movement in response to control signals are used to determine future control signals need to achieve desired robot movements. A computer vision software pipeline, which may be implemented as a multi-stage neural network, is configured to process received images and to generate control signals for reaching a desired movement goal of the robot. When implemented using a neural network, such a network may include at least one recurrent neural network block having a stored state that allows for dynamic temporal behavior. Specifically, such a neural network is configured such that images are the primary input used to control movement of the robot toward a specified goal, though other inputs, such as from servo encoders, potentiometers, contact sensors, and/or force sensors may also be included. Together, these inputs are used to detect responses of the robot to a prior set of control signals. The stored state of the recurrent neural network enables the incorporation of past responses in the prediction of future responses.

Various embodiments of the invention include a robotic system comprising: a movement generation device; a tendon coupled to the movement generation device and to a robotic manipulator, the tendon being configured to move the robotic manipulator in response to the movement generation device; an end effector attached to the robotic manipulator, a pose of the end effector being dependent on movement of the robotic manipulator; a camera configured to generate an image of the end effector; a multi-stage neural network including: a first perception block configured to receive the image and generate an image processing output representative of a state of an object within the image, a policy block configured to generate command signals for movement of the end effector, the generated command signals being based on at least i) a goal for the end effector, ii) the image processing output and optionally iii) a time dependent internal state of the policy block, and a compensation block configured to provide an output for control of the movement generation device based both the command signals and the image processing output; and control logic configured to provide the goal for the end effector to the policy block, or to select the policy block based on the goal for the end effector.

Various embodiments of the invention include a method of controlling a robot, the method comprising: capturing an image using a camera, the image optionally including an end effector connected to a robotic manipulator; processing the captured image to produce a representation of objects within the image, as well as a state of the robot itself; applying a policy to the representation of objects to produce command signals, the production of command signals being based on at least a goal and the representation of objects; compensating for a change in response of the robotic manipulator to command signals, to produce compensated control signals, the compensation being based on prior command signals and the representation of objects; and activating the robot using the compensated control signals.

Various embodiments of the invention include a method of calibrating a robot, the method comprising: generating first control signals; providing the first control signals to a robot, the first control signals optionally being configured to generate an expected movement of an end effector attached to the robot; capturing an image showing a response of the robot to the control signals; generating second control signals; changing a state of the recurrent neural network responsive to the image and the expected movement; and generating second control signals; compensating the second control signals to produce compensated control signals using the recurrent neural network, the compensation being responsive to the changed state of the recurrent neural network, the compensation being configured to reduce a difference between the expected movement and a movement of the end effector indicated by the image.

BRIEF DESCRIPTION OF THE DRAWINGS

FIG. 3 illustrates a neural network at different times, according to various embodiments of the invention.

FIG. 5 illustrates methods of controlling a robot, according to various embodiments of the invention.

DETAILED DESCRIPTION

As used herein, a "movement generation device" is a device that causes movement or force. For example, a movement generation device can include a DC motor, an AC motor, a pneumonic device, a piezoelectric, an electromagnetic driver, a stepper motor, a servo, and/or the like.

As used herein, an "actuator" includes a movement generation device, circuitry configured to control the movement generation device and an optional encoder configured to measure movement or force of the movement generation device.

As used herein, an "end effector" is a device configured to interact with or operate on an object. Examples, of end effectors include, a cutting tool, a gripping tool, a pushing tool, a pulling tool, a lifting tool, a welding tool, a gripping tool, an attachment tool, a heating tool, a soldering tool, a pressing tool, and/or the like. Tools need not make direct contact with an object. For example, a camera, laser, paint gun or a heat lamp may be used as an end effector. In some embodiments, an end effector includes a robotic hand, which has two or more fingers configured to manipulate objects, such as tools and/or work pieces.

As used herein, "logic" is used to refer to hardware, firmware, and/or firmware stored on a computer non-transitory readable medium. Logic includes computing instructions and electronic circuits configured to execute these instructions.

Figure 1:
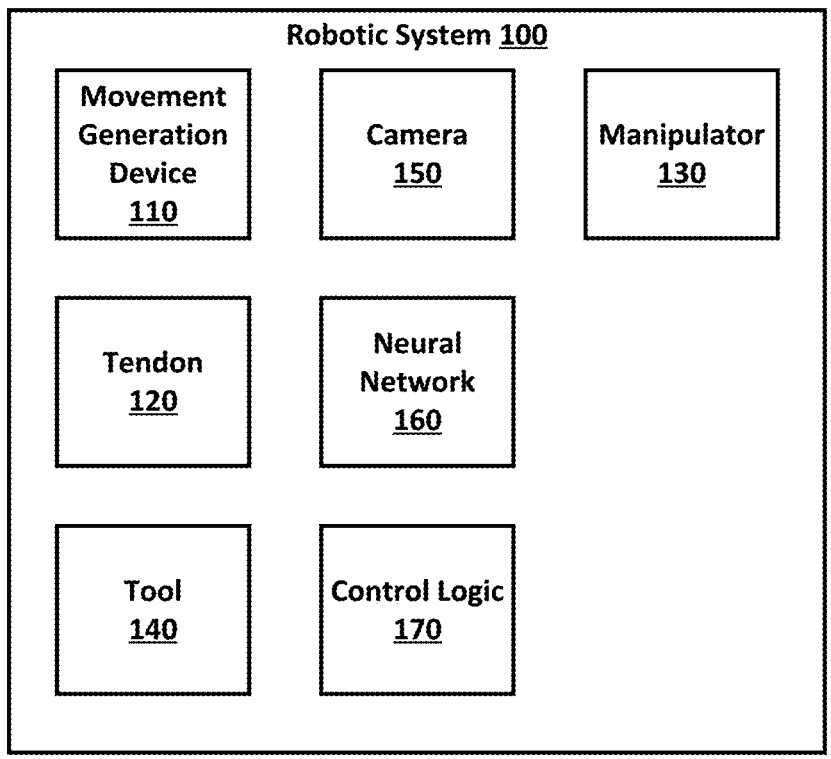
FIG. 1 illustrates a robotic system, according to various embodiments of the invention.

FIG. 1 illustrates a Robotic System 100, according to various embodiments of the invention. Robotic System 100 can include a wide variety of alternative devices. For example, Robotic System 100 can include manipulators configured to move large objects or extremely small devices configured to perform delicate operations such as vascular surgery. Robotic System 100 can include self-guided vehicles such as drones. Robotic System 100 may include a human exoskeleton, or a prosthesis.

Robotic System 100 includes at least one Movement Generation Device 110 optionally configured to generate movement of at least one Tendon 120. Movement Generation Device 110 can include any of the movement generation devices discussed herein. Movement Generation Device 110 is optionally coupled with a control circuit and/or encoder configured to control or measure movement respectively. Movement Generation Device 110 is optionally coupled with a device configured to measure appearance, temperature, pressure, strain, current, or some other indicator of a state of Movement Generation Device 110.

Optionally Tendon 120 is a movable linkage such as a hydraulic coupling, a pneumonic coupling, a cable, a chain, a gear, a cam, a rope, a screw drive, a belt, a pully, and/or the like. Tendon 120 is coupled to Movement Generation Device 110 and at least one robotic Manipulator 130. Each Tendon 120 is configured to convey movement from an instance of Movement Generation Device 110 to one or more respective robotic Manipulators 130. For example, movement generated by an electric motor may be conveyed to a robotic manipulator via a pully and cable. In various embodiments, Tendon 120 may experience changes in length due to load, temperature, age, and/or other factors. Various embodiments include Tendons 120 configured in opposition. For example, a first Tendon 120 may be configured to rotate a joint in a first direction while a second Tendon 120 may be configured to rotate a joint in a second direction. Tendons 120 optionally comprise polymer fibers such as Nylon® and/or Spectra Line®.

Manipulator 130 is typically a load bearing element, such as a wheel, robotic arm or truss. At least one of the one or more Manipulators 130 is configured to be attached to an End Effector 140. A pose of End Effector 140 is dependent on movement of Manipulator 130. Tendon 120 is configured to move Manipulator 130 or End Effector 140 in response to Movement Generation Device 110. Manipulator 130 is optionally a member of a plurality of robotic manipulators configured to manipulate End Effector 140 in the six-dimensional space of pose. Minimally this implies six degrees of freedom, however a robotic system may have more degrees of freedom than this minimal number.

Robotic System 100 optionally further includes one or more Camera 150 configured to generate an image of End Effector 140, Manipulator 130, and/or other objects within a three-dimensional environment. A pose of Camera 150 is optionally dependent on movement of an instance of Manipulator 130. As such, Camera 150 may be positioned in a way similar to other examples of End Effector 140. Some embodiments of Robotic System 100 include a first Manipulator 130 configured to move Camera 150 and a second Manipulator 130 configured to move End Effector 140 within a field of view of Camera 150. Camera 150 is optionally a stereoscopic camera. In some embodiments, Camera 150 is replaced or augmented by an alternative detector such as a laser range finder, time-of-flight sensor, radar, sonic device, or other sensor capable of measuring depth either separately or in addition to color or grayscale imagery. Output from any such sensors or detectors may be processed along with images generated by Camera 150.

Robotic System 100 further includes a Neural Network 160. Neural Network 160 is a multi-stage neural network including at least a perception block, a policy block and a compensation block, (see FIG. 3). These various blocks are optionally combined in one or more neural network stages configured to perform the functionality of the discrete blocks discussed herein for clarity. For example, the all three blocks can be combined in a single neural network stage, or any two of these blocks can be combined in a particular stage. Particular neural network nodes may provide functionality of more than one of the blocks. As such, the boundaries between blocks may not be distinct and one or more neural network system including the functionality described as being provided by each block may be considered to include each of the perception, policy and compensation blocks. As used herein, neural network "blocks" may or may not be distinct from each other.

The perception block is configured to receive an image generated by Camera 150 and to generate an image processing output representative of a state of an object with the image. The policy block is configured to generate command signals for movement of End Effector 140 (or Camera 150). The generated command signals are based on i) a goal for End Effector 140, e.g., a desired pose or movement, ii) the image processing output, and optionally iii) time-dependent internal states of the policy block and/or compensation block. The compensation block is configured to provide an output for control of one or more of Movement Generation Device 110 based both the command signals and the image processing output. This output is typically an adapted version of the command signals generated by the policy block. Any of the perception block, policy block and compensation block can include recurrent neural network layers.

Robotic System 100 further includes Control Logic 170. Control Logic 170 is configured to provide a goal for movement of End Effector 140, to the policy block. Alternatively, Control Logic 170 may be configured to select a particular policy block configured to execute a specific goal. In specific examples, Control Logic 170 is configured to receive a set of instructions to move an object from a first location to a second location. This task is divided into multiple steps each represented by a goal. The specific goals may be to 1) move a gripping tool adjacent to the object, 2) grasp the object using the gripping tool, 3) lift the object using the gripping tool to a first intermediate position, 4) move the object to a second intermediate position, and 5) place the object on a designated surface. Control Logic 170 is optionally configured to divide a task in to specific goals. Each of these goals is optionally performed by a different policy block.

In some embodiments, a particular policy block is configured to perform multiple goals and/or specific classes of goals. In these embodiments, a specific goal is provided to the policy block at execution time. Control Logic 170 is optionally configured to select a policy block based on a specific goal class. For example, a specific policy block may be configured to execute "linear movement goals." This policy block may receive a destination and a velocity; or a vector, velocity and distance, and use this information to perform a specific movement goal. Other specific policy blocks may be configured to execute "gripping goals," "attachment goals," "rotation goals," "position relative to goals," "insert goals," "cut goals," and/or the like.

In some embodiments, Control Logic 170 is configured to include default goals, such as avoiding a collision between Manipulator 130 and a person nearby, or avoiding contact between two different instances of Manipulator 130. Control Logic 170 may further be configured to select between different available end effectors for a task, for example between a gripping tool and a cutting tool. These different end effectors may be attached to different instances of Manipulator 130 or be alternatively attached to the same instance of Manipulator 130. Control Logic 170 may be configured to provide goals related to movement of Camera 150 and/or goals related to identifying a particular object. For example, Control Logic 170 may provide goals to identify male and female parts of a connector and positioning Camera 150 such that insertion of the male part into the female part can best be observed. Other goals provided by Control Logic 170 can include object recognition goals, movement goals, gripping goals, cutting goals, attachment goals, insertion goals, heating goals, positioning goals, activation goals (e.g., press the ON button), rotation goals, lifting goals, releasing goals, placement goals, and/or goals relating to any other interactions between End Effector 140 and on object.

Goals generated by Control Logic 170, and thereby selection of policy blocks, optionally depend on outputs of a perception block. For example, the outputs of a perception block may be used to identify a location, orientation and/or identity of an object. In one example, an orientation of an object may result in a goal of rotating the object to a different orientation. In another example, identification of a human hand by a perception block may result in a goal to avoid the hand or interact with the hand. In a specific example, the goal may be to avoid contact between a cutting tool and a moving hand or to accept an object from the hand.

In some embodiments, a goal generated by Control Logic 170 is configured for calibration of the compensating block. For example, Control Logic 170 may generate a series of movement goals for the purpose of observing a resulting movement of End Effector 140. In this case, Camera 150 and the perception block are used to determine actual movements in response to control signals generated by the compensating block. Such movements and measured results cause a change in state of the compensating block and/or policy block, making the compensating block and/or policy block better able to generate command signals that will result in a desired movement.

In some embodiments, Control Logic 170 is configured to divide a task into goals of different magnitude. For example, a task of moving a gripping tool in position to grip an object may include a goal of moving a first distance, a goal of moving a second distance and a goal of moving a third distance. The first distance being larger than the second distance and the second distance being larger than the third distance. The goal of moving the second distance may be generated before after execution of the goal of moving the first distance. More specifically, a task of moving approximately 11 cm may be divided into a goal of making a 10 cm movement, a goal of making a 1 cm movement and one or more goals of making sub-1 mm movement. A result of executing $1^{st}$ goal is considered in defining the requirements of the $2^{nd}$ goal and a result of executing the $2^{nd}$ goal is considered in the number and requirements of subsequent goals. Such a task may be used, for example, to precisely place a pin in a hole.

A task performed using Control Logic 170 can include operation or activation of a machine. For example, a task may include electropolishing a part. Control Logic 170 can divide this task into goals such as picking up the part, attaching an electrode to the part, closing a protective cover, placing the part in an electropolishing bath, activating (turning on) an electropolishing circuit, opening the cover, removing the part from the bath, disconnecting the electrode, and/or placing the part on a transport device to be taken to a location of the next task to be performed on that part. Activating the electropolishing circuit can include pressing a button using an instance of End Effector 140, activating a circuit using a command issued by Policy Block 320, and/or the like. Machine activation as part of a task performed using Control Logic 170 can include activating a washing device, a heating device, a cutting device, a spraying device, drilling device, a mixing device, a pressing device, a deposition device, a programming device, and/or any other device used in logical, mechanical or chemical processing of an object.

In some embodiments the start or completion of a goal are determined by visual input from Camera 150. For example, one or more images from Camera 150 may indicate that a gripping tool is in position to grip a target object, and subsequently that the gripping tool is in contact with the object. These images may be used to represent the completion of a positioning goal, the start of a gripping goal and the completion of a gripping goal. The one or more images are used to determine relative relationships between the objects, not necessarily absolute positions of the objects. This allows goals to be defined in terms of relative relationships between objects. For example, a goal may include moving a gripping tool to a pose (+/−some margin of distance error) relative to a target object. This goal can then be achieved even if the location and/or orientation of the target object changes as the goal is being executed.

Figure 2:
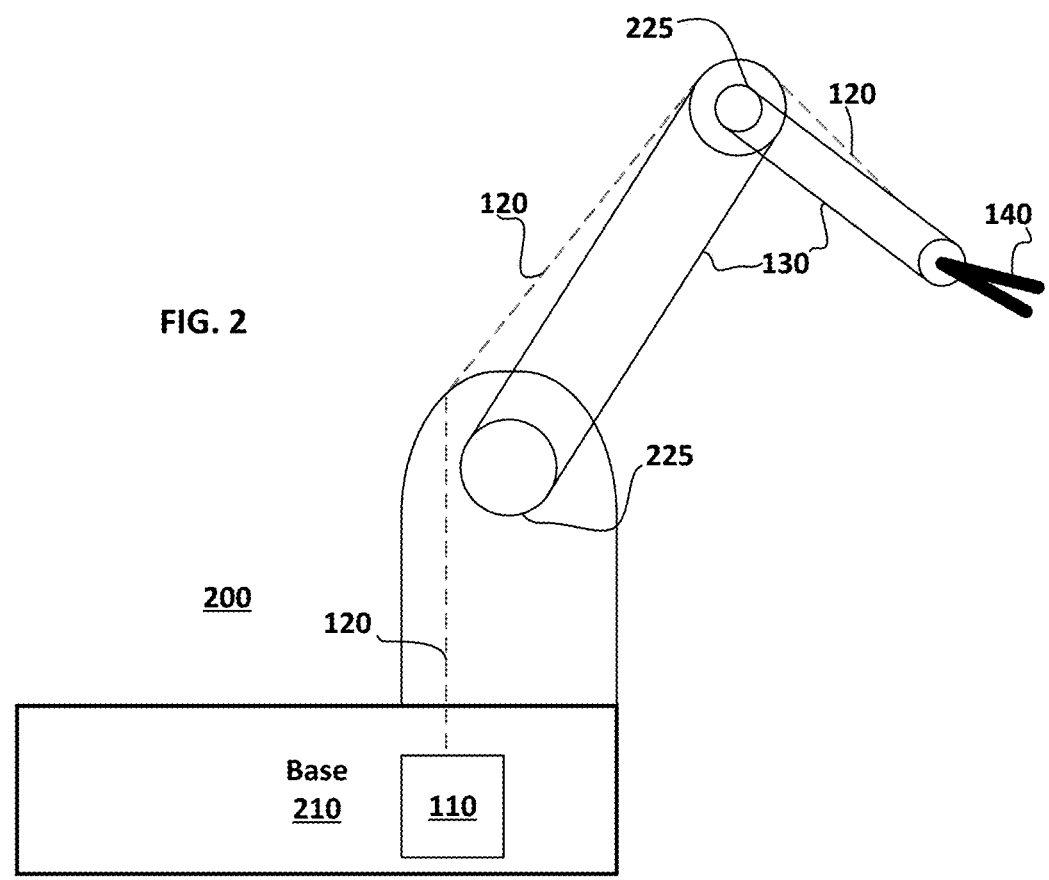
FIG. 2 illustrates a robot, according to various embodiments of the invention.

FIG. 2 illustrates a Robot 200, according to various embodiments of the invention. The Robot 200 is meant as an illustrative example. Various embodiments of the invention include a wide variety of robotic architectures, designs and structures in addition to or instead of those illustrated in FIG. 2, which is for illustrative purposes. Robot 200 can include a system of arbitrary complexity and may include multiple End Effectors 140 of any type known in the field of robotics. Robot 200 can include both robot arms, e.g., one or more Manipulators 130 and robot hands, e.g. End Effectors 140, having one or more "fingers." By using image input, the systems and methods described herein can be used to control both the robot arms and robot hands. Generated images detect the result of movement of both the "arms" and "hands" of Robot 200 and, as a result, a neural network trained using such images inherently provides an optimal balance between control of the movement of the arms and hands. For example, the generated movement of the arms and hands can have an optimal relative magnitude optimized to achieve a goal. In a specific case, picking up an object using a robot hand, e.g. End Effector 140, can include movement of both an arm, e.g., one or more Manipulators 130, and fingers of the hand. The neural network system described herein, trained based on images generated using Camera 150, can result in an optimal movement. The optimization being with regard to minimal error toward achieving a desired goal, minimal total movement, minimal energy usage, most probable goal achievement, minimal adverse effects (e.g., damage to a target object or person), and or the like. Robot 200 can include large scale robots configured to manipulate heavy loads, small scale robotics configured to perform surgery or modify integrated circuits, mobile robots, and/or the like.

Robot 200 includes a Base 210 configured to support other elements of Robot 200. Base 210 can be fixed, movable, or mobile. For example, in some embodiments Base 210 includes propulsion, a conveyor, wheels or tracks, and movement of an End Effector 140 optionally includes movement of Base 210. Alternatively, Base 210 may be configured to be bolted or otherwise fixed to a floor and to support heavy loads manipulated by one or more End Effectors 140. Alternatively, Base 210 may include a body of a walking robot in which End Effectors 140 include tracks, pads or feet. Alternatively, Base 210 may include a body of a floating or submersible embodiment of Robot 200. Base 210 may be configured to support multiple robotic arms and End Effectors 140.

Robot 200 further includes at least one Movement Generation Device 110. Movement Generation Device 110 is configured to generate movement, e.g., rotational and/or linear movement. In some embodiments, Movement Generation Device 110 is attached to a Tendon 120, Tendon 120 is attached to a Manipulator 130, and Manipulator 130 is attached to End Effector 140, such that the pose of End Effector 140 is responsive to movement generated by Movement Generation Device 110. End Effector 140, Manipulator 130 and/or Movement Generation Device 110 are optionally separated by at least one Robotic Joint 225. In various embodiments, an instance of Movement Generation Device 110 is connected to a particular End Effector 140 by a Tendon 120 that traverses one, two, three or more Robotic Joints 225.

Robotic Joint 225 can include, for example, linear joints, orthogonal joints, rotational joints, twisting joints, or revolving joints. Instances of Robotic Joint 225 can be configured to couple Bass 210, Manipulators 130, and/or End Effectors 140. In various embodiments, End Effector 140 and/or Manipulator(s) 130 are separate by one or more Robotic Joints 225. Tendon(s) 120 are optionally configured to traverse these Robotic Joints 225. For example, as illustrated in FIG. 2, Tendon 120 can extend from Movement Generation Device 110, past one or more Robotic Joints 225, past one or more Manipulators 130, to terminate in a connection to one of Manipulators 120 or End Effector 140.

FIG. 3 illustrates instances of Neural Network 160 at different times, according to various embodiments of the invention. Neural Network 160 includes at least a Perception Block 310, a Policy Block 320 and a Compensation Block 330. Neural Network 160 is configured to receive images, and based on those images generate command signals configured to control Movement Generation Device 110. The command signals are generated to complete a goal, such as movement or operation of End Effector 140.

Perception Block 310 includes a neural network configured to receive an image, and/or series of images, and generate an image processing output representative of the state of an object within the image. The image processing output can include object features, e.g., corners, edges, etc., identified within an image; and/or relationships therebetween. In a specific example, the image processing output can include joint angles and positional coordinates of the fingers of a robotic hand, and distances between these fingers and an object. The image processing output can include classifications and/or identifications of objects with an image. The image processing output can include data characterizing differences between two images, for example, a number of pixels an object has moved between images, or numbers of pixels particular object features have moved between images. In various embodiments Perception Block 310 is configured to generate an image processing output based on a stereo image. In various embodiments Perception Block 310 is configured to determine spatial relationships between objects. For example, Perception Block 310 may be configured to generate an image processing output representative of a distance between a target object and End Effector 140. The image processing output optionally includes a representation of a pose of an object within the image and/or a pose of End Effector 140.

Perception Block 310 optionally includes a recurrent neural network in which the processing of an image results in a change in state in of the neural network. The change in state is typically represented by a change in operation of specific nodes within the neural network. This change in operation is, optionally, a result of a previous (e.g., recurrent) output of that specific node or other nodes within the network. Specifically, a previous output may be included as a (recurrent) input to the operation of the node. Specific nodes, sets of nodes, levels of nodes, and/or entire blocks of nodes may be recurrent to any previous output, and thus their operational state may change over time. A recurrent instance of Perception Block 310 may be used to detect changes between images. For example, movement of objects as seen in different images or a change in viewpoint from which the image is obtained.

In some embodiments, Neural Network 160 includes a plurality of Perception Blocks 310. Each of these Perception Blocks 310 are optionally associated with a different camera, the different cameras having overlapping fields of view such that they can be used to view an object from different viewpoints. As discussed elsewhere herein, e.g., with reference to FIG. 4, a multiplex layer is optionally used to selectively communicate image processing outputs from each of the Perception Blocks 310 to one or more Policy Block 320. The different Perception Blocks 310 are optionally configured to process images in different ways. For example, one Perception Block 310 may be configured to read barcodes, another Perception Block 310 may be configured to recognize particular objects, e.g., faces or end effectors, and/or another perception block may be configured to measure distances based on a stereo image pair. One of Perception Block 310 may be configured to detect geometric objects such as a bolt or an integrated circuit while another Perception Block 310 is configured to identify people, e.g., a hand in a work area. Perception Blocks 310 may process images in parallel or serially. For example, in parallel processing, a first Perception Block 310 may process an image at the same time that a second Perception Block 310 is processing the same image or a different image.

In various embodiments, image processing outputs of Perception Block 310 includes a representation of a distance between End Effector 140 and an object as seen within a processed image, and/or a distance between two objects with the image. The outputs can include a representation of an object within a three-dimensional environment. In various embodiments, image processing outputs include a representation of a change in state of an object within a processed image, as compared to a prior image. For example, the outputs can include information regarding translation or rotation of an object, a change in color of an object, filling of a seam, hole, or gap (as in a welding operation), addition of a material (as in a soldiering operation), alignment of objects or surfaces (as in positioning of an object at a desired place or a screw over an opening), insertion of one object into another, and/or the like.

In some embodiments, image processing outputs of Perception Block 310 includes estimates of positions of objects that are occluded by other objects within an image. For example, if a first object is moved in front of a second object, a position of the second object may be estimated from data received in prior images. The "memory" of the position of the second object can be retained in a state of the Perception Block 310, where Perception Block 310 includes one or more recurrent layers. Such memory may be otherwise stored in an external memory that is accessed by the neural network, such as with a Differentiable Neurocomputer.

Policy Block 320 is configured to generate command signals for movement of End Effector 140. The generated command signals are based on at least: 1) a goal for movement of End Effector 140, 2) the image processing output received from Perception Block(s) 310, optionally 3) a time dependent internal state of Policy Block 320, and optionally 4) feedback received from Compensation Block 330. Neural Network 160 optionally includes multiple Policy Block 320. Optionally, different instances of Policy Block 320 are configured to perform different tasks and/or goals. For example, one instance may be configured for accomplishing a welding goal while other instances are configured for accomplishing moving or gripping goals. An instance of Policy Block 320 may be configured to accomplish any one or more of the goals discussed herein. Selection of a particular instance of Policy Block 320 for processing a particular image is optionally responsive to a type of goal for movement of End Effector 140. For example, an instance of Policy Block 320 configured to accomplish a gripping goal may be configured to generate commands that result in applying a particular force using an instance of End Effector 140 configured for gripping. Instance of Policy Block 320 can, thus, be configured to generate command signals for a wide variety of different specific actions.

Policy Blocks 320 may be configured to generated command signals for a specific task, for classes of tasks, or in some embodiments an instance of Policy Block 320 is configured to generate command signals for general tasks. For example, one instance of Policy Block 320 can be configured to generate command signals for a movement task while another instance of Policy Block 320 is configured to generate command signals for driving a screw. A Policy Block 320 for a specific task or class of tasks may be selected using Control Logic 170, from a plurality of alternative Policy Blocks 320, for processing of an image processing output received from Perception Block 310. The selected being based on a current goal and/or task. A policy selection may occur external to the system illustrated in FIG. 3. For example, a policy may be selected using an embodiment of Control Logic 170 including a finite state machine. Alternatively, selection of a policy may be performed by a separate neural network or portion of the policy network configured so as to respond to different visual or other cues to determine the relevant policy or policy phase to execute at some particular moment.

Policy Block 320 optionally includes recurrent layers in which a state of Policy Block 320 is changed through processing of image processing output. These changes in state impact how the next image processing output is processed using the same Policy Block 320. The processing of image processing output can, thus, be dependent on prior states of Policy Block 320. In some embodiments, Policy Block 320 is configured to receive outputs (image processing outputs) from multiple Perception Blocks 310. These outputs can be received in parallel or serially. For example, in some embodiments, Policy Block 320 is configured to receive outputs from a first Perception Block 310 configured to determine distances between objects, a second Perception Block 310 configured to detect orientation of objects and a third Perception Block 310 configured to detect presence of a person. These outputs may be received at essentially the same time or one of the outputs at a time. Command signals generated by Policy Block 320 can be configured to move End Effector 140, to move an object to grasp an object, to apply a pressure, to rotate an object, to align objects, and/or any other action disclosed herein.

In some embodiments, multiple Policy Blocks 320 are configured to process image processing outputs in a serial manner. For example, a first Policy Block 320 may receive the image processing output from Perception Block 310 and determine if a goal has been achieved. If the goal has not been received the image processing output is provided to a second Policy Block 320 configured to generate control signals for moving End Effector 140 to a new pose-based on the goal. These control signals, and optionally the image processing output are then received by a third Policy Block 320 configured to adjust these control signals, if necessary, such that the movement of End Effector 140 does not result in a collision with a person or other object.

One or more of Policy Block 320 is optionally configured to receive image processing output based on images received from multiple Cameras 150, and to generate the command signals based on the multiple images. The images may be received and/or processed in serial or parallel. For example, Cameras 150 may be disposed to view an environment and/or object from several different vantage points and Policy Block 320 may use images generated by these Cameras 150, in combination, to generate control signals.

In a specific example, command signals generated by Policy Block 320 may be configured to move End Effector 140 10 cm, and image processing output may reveal that the last command signals intended to move End Effector 140 by 15 cm resulted in a movement of only 14.5 cm. In response to this information, Compensation Block 330 is configured to adjust the command signals received from Policy Block 320 such that the resulting movement of End Effector 140 is closer to 10 cm relative to the movement that would result from uncompensated command signals. Compensation Block 330 uses differences between expected movement (or other operation) of End Effector 140 and actual detected movement to adjust future command signals such that the adjusted command signals better result in the desired movement. Adjustment for operations other than movement are compensated for in a similar fashion.

The command signals generated by Policy Block 320 are typically sent to Compensation Block 330 for adjustment. Compensation Block 330 is configured to adjust the command signals based on at least the image processing output (generated by Perception Block(s) 310), and to produce a resulting output for control of Movement Generation Device 110. Compensation Block 330 is responsive to both the image processing output, as generated by Perception Block(s) 310, and command signals generated by Policy Block(s) 320. Optionally, Compensation Block 330 is configured to receive a copy of the image processing output that has not been processed by Policy Block 320.

A purpose of the dependence on the image processing output is so that Compensation Block 330 can adjust the command signals responsive to changes in the environment which occurred as a result of recent, e.g., the last, actions by Movement Generation Device 110. Specifically, Compensation Block 330 is configured to use the image processing output to modify control signals sent to Movement Generation Device 110, where the modification is responsive to how Movement Generation Device 110 responded to recent control signals as indicated by the image processing output. Compensation Block 330 is optionally configured to determine a result of a prior set of control signals provided to Movement Generation Device 110 based on the image processing output, and to adapt subsequent control signals responsive to this result.

Compensation Block 330 is, thus, able to adjust command signals over time to compensate for inaccuracies in the expected physical dimensions and other properties of Robot 200, physical changes in parts of Robot 225, changes that occur over time, changes in environment in which Robot 225 is operated, and/or the like. These changes can include changes in length of Tendons 120 or Robotic Manipulator 130, wear in gears and/or backlash resulting from wear, Robotic Joints 225 or actuators, temperature changes, changes in spring strength, changes in hydraulic or pneumatic system response, loads on Movement Generation Device 110, weights and balance of objects being manipulated, changes in motor power, and/or the like. For example, Compensation Block 330 is optionally configured to compensate for weight of an object lifted by the end effector, by adapting the output for control of Movement Generation Device 110. This adaptation may occur in real-time based on the identity of an object or failure to move the object as expected using a prior command. Such an adaptation can include, for example a change in a selected voltage, current or digital input provided to Movement Generation Device 110.

The system may possess memory, either explicitly, or implicitly through the configuration of recurrence or other properties of a neural network, which has the function of associating changes in control policy with different objects the robot is intended to manipulate. These changes may be effective when an object is seen, when it is grasped, when it is lifted, or at any other subset of the overall task of manipulating the object. These changes may affect how actuators are used, what limitations are placed on the actuator motion or energy, force applied, or any other thing material to the strategy for manipulation, including such actions as might be used to pre-tension elastic elements of the system or changes in the grasping or lifting strategy (e.g. grasp around a light object and lift transverse to the grasp forces (i.e. relying on friction) vs. grasping beneath a heavy object and lifting in the direction of the grasp forces (i.e. presuming friction to be unreliable).

Optionally some Policy Blocks 320 are configured for calibration of Compensation Block 330. These Policy Blocks 320 generate command signals specifically selected to clearly detect resulting actions (e.g., movements) of End Effector 140 and, as such, alter the state of Compensation Block 330 to improve adjustments of command signals made by Compensation Block 330. The state of Compensation Block 330 is, thus, optionally representative of a prior response of the Robotic Manipulator to (adapted) command signals sent to Movement Generation Device 110.

Any combination of Perception Block 310, Policy Block(s) 320, and/or Compensation Block 330 may be trained together or separately. For example, in some embodiments, Perception Block 310 is first trained to generate processed image outputs. These outputs are then used to train Policy Block 320. Finally, all three blocks may be further trained as a unit.

FIG. 3 illustrates Neural Network 160 at a "Time A" and a "Time B." Perception Block 310, Policy Block 320, and/or Compensation Block 330 may have different states at these different times, the states being indicated by "310A" and "310B" etc. A first image is processed at Time A and a next or subsequent image is processed at Time B. Because of the recurrent layers in at least the Compensation Block 330, the processing of the first image effects how the second image is processed. Specifically, the change in state may be reflected by changes in operation of nodes in the neural network and these changes impact the processing of later images. The system is adapted (learns) in real time using received images.

Arrows within FIG. 3 represent examples of movement of image processing output (340), movement of command signals (350) and possible movement of state information (360).

Figure 4:
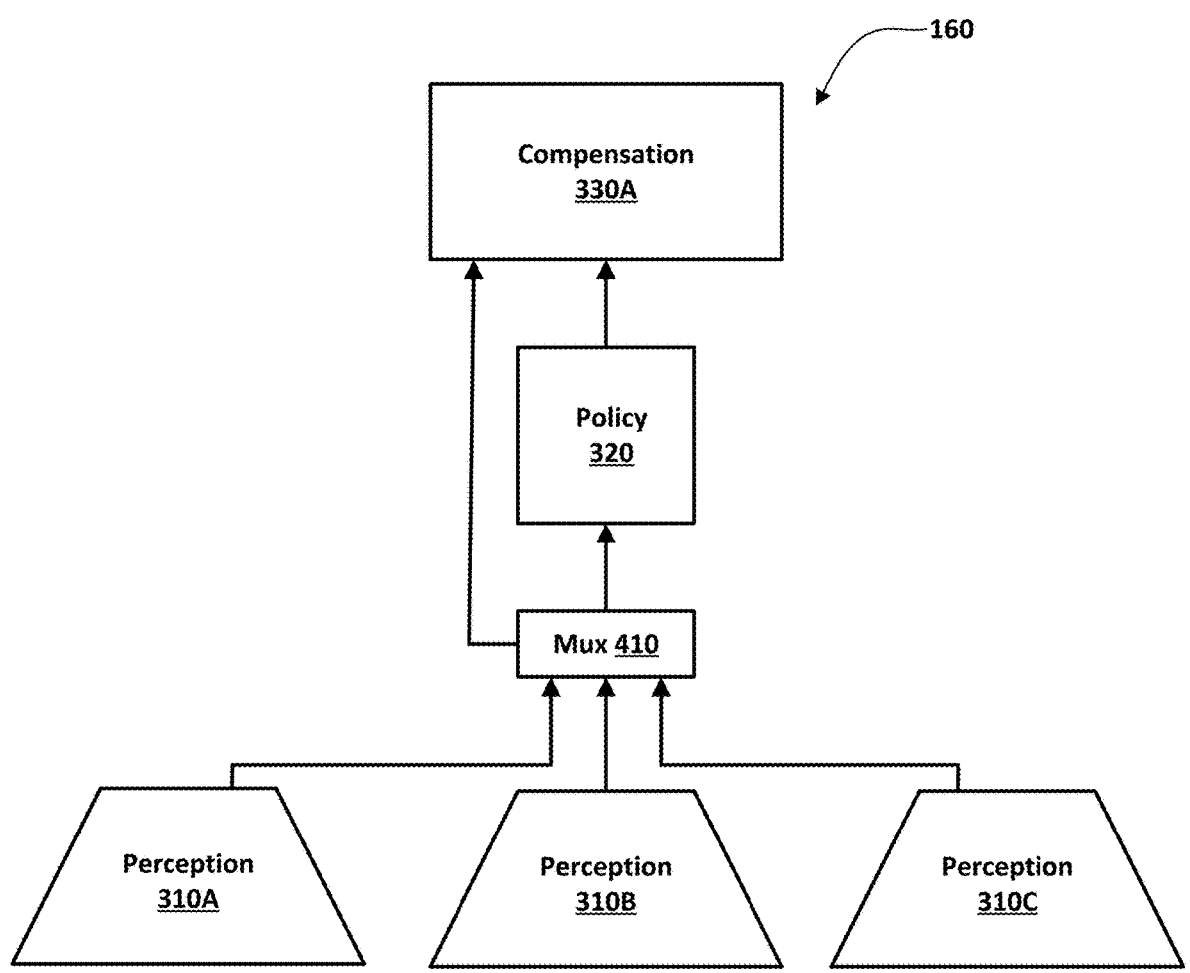
FIG. 4 illustrates a neural network including one or more multiplex layer, according to various embodiments of the invention.

FIG. 4 illustrates embodiments of Neural Network 160 including one or more multiplex layer. In these embodiments a multiplex block (Mux 410) is configured to receive image processing outputs from several Perception Blocks 310 (indicated 310A, 310B and 310C, etc.) and to communicate these image processing outputs to one or more Policy Block 320. The image processing outputs are optionally generated based on images and/or other sensor data, received from different cameras and/or other sensors. Mux 410 may be configured to provide these outputs in parallel or serially. In some embodiments Mux 410 is configured to generate a three-dimensional representation of an environment in which Robotic System 100 operates based on the received image processing outputs, and then provided that representation to Policy Block 320.

In some embodiments, Perception Blocks are used selectively. For example, for achieving a particular goal, the output of Perception Block 310B may not be relevant. In this case Perception Block 310B may not be used to process an image. In a more specific example, if Perception Block 310B is configured to receive an image from a camera that does not have a useful view of End Effector 140 and an object, then an image from that camera may not be computed and/or results of any processing of that image may not be passed to any of Policy Blocks 320.

Alternative embodiments, not shown, Mux 410 may be configured to receive command signals from multiple Policy Blocks 210 and provide these command signals to Compensation Block 330. These embodiments of Mux 410 are optionally configured to process or combine the received command signals. For example, if a first Policy Block 210 is configured to generate an output to move End Effector 140 and a second Policy Block 210 is configured to avoid having End Effector 140 hitting a nearby person, then Mux 410 may be configured to assure that command signals are communicated such that the goal of not hitting a person takes priority. In another example, Mux 410 is optionally configured to combine command signals received from two different instances of Policy Block 210, where a first instance of Policy Block 210 is configured to generate control signals to a first instance of Movement Generation Device 110 (optionally coupled to a first Robotic Manipulator 130) and a second instance of Policy Block 210 is configured to generate control signals to a second instance of Movement Generation Device 110 (optionally coupled to a second Robotic Manipulator 130). The first and second Robotic Manipulator 130 may be part of a same robotic arm, optionally separated by an instance of Robotic Joint 225, configured to move a single End Effector 140 as illustrated in FIG. 2, or may be attached to separate End Effectors 140 configured to work together on an object.

In some embodiments, a single Policy Block 210 is configured to control multiple Robotic Manipulators 130. These Robotic Manipulators 130 may be part of a single robotic arm or part of separate robotic arms. For example, a single Policy Block 210 may be configured to control a Robotic Manipulator 130 used to position a screw and also to control a Robotic Manipulator 130 used to rotate a screwdriver. By using a single Policy Block 210 the two (or more) robotic arms may be operated in a coordinated fashion. Likewise, if a single Policy Block 210 is used to control to Robotic Manipulators 130 which are part of the same robotic arm, their movement can be coordinator to achieve a goal.

FIG. 5 illustrates methods of controlling a robot, according to various embodiments of the invention. The methods illustrated in FIG. 5 are optionally performed using Robotic System 100 and/or Neural Network 160. The methods include using images, and optionally other sensor data, as the primary input to control positioning and/or use of an end effector, such as End Effector 140. Recurrent layers within Neural Network 160 are configured such that control signals can be adapted based on the results of prior control signals as indicated in the images In a Receive Task Step 405, a task for the operation of Robotic System 100 is received. As described elsewhere herein, this task can be, for example, to place an object in a particular position, to pick up an object, to connect two objects, to apply heat or other processing to an object, and/or the like. In an illustrative example, tasks may include 1) placing an adhesive on a first object (with a certain application profile), 2) placing a second object against the first object, and 3) removing excess adhesive. The goals are optionally received by Control Logic 170 from a source external to Robotic System 100. For example, a human user may enter a series of tasks via a user interface displayed on a client device.

In an optional Divide Task Step 410, the one or more tasks received in Receive Task Step 405 are divided into specific goals. As noted elsewhere herein, goals are specific steps that may be performed to complete a task. For example, the above task of placing an adhesive on a first object may be divided into goals of: a) positioning the object, b) picking up a glue dispenser, c) positioning the glue dispenser relative to the object, d) compressing the glue dispenser to cause glue to be released onto the object, and e) moving the glue dispenser (or object) as the glue is released. Each of these steps can be performed using camera-based monitoring and real-time feedback via Neural Network 160. For example, compressing the glue dispenser may be monitored using an instance of Policy Block 320 specifically configured to receive and use criteria for how a desired bead of glue should appear on the object. Divide Task Step 410 is optionally performed using Control Logic 170.

In some cases, the goals themselves may be understood by the policy block using input from the Perception Block 310. For example, the robot may be presented with an image or video that describes, demonstrates, or shows, the correct behavior, or some aspect of it. As a concrete example, the robot may be presented with the image of a correctly assembled part and given the components. Based on the image, the robot's task (and goals) may be implicitly defined, i.e. to put the pieces together to form the assembled part shown in the image. Policy Block 320 is optionally trained using a "mirror neuron" system and inverse reinforcement learning.

In a Capture Image Step 415, one or more images are captured using Camera 150. The one or more images typically include End Effector 140 and/or an object to be manipulated by End Effector 140. As noted elsewhere herein, in various embodiments, Camera 150 may be supplemented by other sensing devices such as a laser range finder, radar, an acoustic range finder, a pressure sensor, an electrical contact sensor, a current or voltage sensor, a magnetic sensor, an encoder, any other sensor or detector discussed herein, and/or the like. In these embodiments, respective sensor data may also be received from one or more of these devices in Capture Image Step 415.

In a Process Image Step 420, the image(s) and optionally other sensor/detector data received in Capture Image Step 415 are processed using Neural Network 160. This processing results in at least one "image processing output" as discussed elsewhere herein. The image processing output can include information derived from the one or more images and/or from any of the other sensor data from any of the other sensors discussed herein. In various embodiments, the image processing output includes features of a processed image, and/or differences between different images. In some embodiments, image processing outputs include a representation of objects within a three-dimensional environment. For example, the image processing output can indicate object orientation and/or spatial relationships between objects in three dimensions. Process Image Step 420 is optionally performed using Perception Block 310 and can result in any of the image processing outputs taught herein to be generated by Perception Block 310.

In an Apply Policy Step 430, the one or more image processing outputs generated in Process Image Step 420 are used to generate control commands configured for the control of a robotic device, such as Robot 200. The control signals are generated in response to a goal, as well as the image processing output. The goal can be a subset of a task, as described elsewhere herein. The control commands are optionally configured to cause operation of Movement Generation Device 110.

Apply Policy Step 430 optionally includes selection of one or more Policy Block 320 from a plurality of Policy Blocks 320, for the processing of the image processing outputs. Specific instances of Perception Block 310 may be associated with specific instances of Policy Block 320. For example, an instance of Perception Block 310 configured to detect presence of a person in an image may be associated with an instance of Policy Block 320 configured to assure that End Effector 140 does not come in contact with a person. In another example, a Perception Block 310 configured to analyze an image of a glue bead or a metal weld may be associated with a Policy Block 320 configured to generate command signals to deposit the glue bead or metal weld, respectively. Outputs of this Perception Block 310 are sent to, at least, those Policy Blocks 320 with which they are associated, optionally among other Policy Blocks 320.

In Apply Policy Step 430, Policy Blocks 320 are optionally selected for processing of specific image processing outputs based on the contents of these image processing outputs. For example, if a specific object is identified as being with in an image, then a Policy Block 320 configured (e.g., trained) to generate command signals to manipulate the identified object may be selected. For example, an image including a flask of a liquid may result in an image processing output identifying the flask and liquid carrying capacity, and this output may be assigned to an instance of Policy Blocks 320 specifically configured to move flasks of liquids.

Selection of one or more specific Policy Block(s) 320 is optionally included in Process Image Step 420. A particular image or other sensor data may be processed using multiple Policy Blocks 320, each of the Policy Blocks 320 being trained for a different purpose. For example, an image may be processed by a first Policy Block 320 configured to monitor an amount of glue applied to an object and also processed by another Policy Block 320 is configured to monitor movement of a glue dispenser relative to the object.

Command signals generated by Policy Block(s) 320 may indicate that a goal has been achieved. For example, if completion of a goal requires no additional action by Robot 200 and/or End Effector 140, then a goal may be considered complete. In some embodiments, the completion of a goal is indicated by a particular sensor state. For example, a temperature sensor may indicate that a desired temperature has been reached or a current sensor may indicate that two conductors are in contact with each other. This sensor state may be recognized by Perception Block 310 as indicating that the goal has been completed. Policy Block 320 may be trained with the objective of reaching this sensor state. Specifically, in some embodiments, a particular sensory state, recognized by the Perception Block 310, is sufficient to distinguish a completed goal from an incomplete goal. In such a case, the Policy Block is trained to recognize this state and terminate the policy.

In an optional Goal Achieved? Step 440, a determination is made as to whether the current goal has been achieved. Achievement may be indicated by location, orientation, and/or other characteristic of an object; connections between objects; and/or completed modification of one or more objects. The determination of whether a goal has been achieved is typically based at least in part on the representation of object embodied in the image processing output.

Goal Achieved? Step 440 is optionally included in an early part of Apply Policy Step 430. As such the determination of whether a goal has been achieved can be made prior to further processing of an image processing output by Policy Block 320. In some embodiments, a goal may be aborted instead of being completed.

In an optional Request Goal Step 445, a new goal is requested. The new goal can be part of an existing task or a new task. The new goal is typically provided by Control Logic 170. New goals may be requested when a prior goal is completed or aborted.

In a Compensate Step 450, the command signals provide by one or more of Policy Blocks 320 are adjusted to produce compensated control signals. In various embodiments, the compensation is based on any combination of: the received command signals, past command signals, image processing output, goals, safety requirements, a current state of Compensation Block 340, one or more prior states of Compensation Block 340, and/or the like. Compensation Step 450 is optionally performed using Compensation Block 340. The compensation can include, for example, an adjustment in a current, voltage, distance, pressure, digital command, time period, and/or any other aspect of control signals. In some embodiments, the compensation is for a change in response of Robotic Manipulator 130 and/or End Effector 140 to prior (optionally compensated) control signals. This change can occur over time or can be in response to a load on End Effector 140, e.g., lifting of a heavy object or cutting a tough object.

In some embodiments, Compensate Step 450 uses one or more recurrent layers within Compensation Block 340 in order to make the compensation dependent on past commands and observed responses to these commands by Robotic System 100. The recurrent layers are configured such that differences, between expected responses and observed responses (as observed in the images processed by Perception Block(s) 310) of Robotic System 100 to received command signals, result in changes to the state of Compensation Block 340. These changes are configured such that the response of Robotic System 100 to future compensated command signals is closer to a desired and/or expected response.

For example, if a goal is to move End Effector 140 a distance of 20 cm in a direction X over a period of 3 seconds and control signals to perform this movement result in movement of only 18 cm in a direction X+10 degrees over 5 seconds, as observed by Camera 150, then the state of Compensation Block 340 is changed such that the next compensated command signals generated for this same goal result in a movement closer to 20 cm (relative to 18 cm), closer to direction X (relative to direction X+10 degrees), and/or a time of movement closer to 3 seconds (relative to 5 seconds). Direction X may be defined in a two or three-dimensional coordinate system. In some embodiments, adjustments to command signals made by Compensation Block 330 are optionally provided as feedback to one or more of Policy Blocks 320 in order to change a state of Policy Blocks 320. This change in state is also typically configured to adjust future command signals to be more likely to produce desired responses in Robotic System 100. In these embodiments, any of the various features described herein as being included in Compensation Block 340 are optionally included in Policy Block 330.

Compensation Block 330 is optionally configured to compensate for a change in the length of one or more Tendons 120. These Tendons 120 may be configured to move Robotic Manipulators 130 and/or End Effectors 140.

The Robotic Manipulators 130 may be part of the same or different robotic arms. In a specific example, Compensation Block 330 is configured to generate compensated command signals to coordinate movement of two or more End Effector 140 to desired relative poses. Compensation Block 330 is optionally configured to compensate for variations in the length of Tendon 120 of at least 0.25%, 0.5%, 1%, 2%, 3%, 10%, or any range there between. Compensation Block 330 is optionally configured to compensate for play in positioning of Robotic Manipulators 130 and/or End Effectors 140 that results from changes in lengths or effective lengths of Tendons 120 configured in opposition, and/or for play or hysteresis in other movement coupling devices. In a specific example, Policy Block 320 may be configured to detect play or hysteresis is the positioning of End Effector 140 and Compensation Block 330 may be configured to adjust for this hysteresis by adapting control signals such that the hysteresis is compensated for or eliminated. Compensation Block 330 may, thus, auto-tension Tendons 120 in real-time.

In an Activate Step 460, one or more of Robotic Manipulators 130 are activated using the compensated command signals generated by Compensation Block 340. This activation can include sending the compensated command signals to Robot 200 from Neural Network 160 via a communication network.

Several embodiments are specifically illustrated and/or described herein. However, it will be appreciated that modifications and variations are covered by the above teachings and within the scope of the appended claims without departing from the spirit and intended scope thereof. For example, the systems and methods discussed herein can be applied to an exoskeleton, a prosthetic device, a vehicle, and/or a system configured to interact with a human. For example, Robotic System 100 could be configured to hand an object to a person, or to control a prosthetic limb. While the examples provided herein are focused on "images" collected by a camera, these described systems may be configured to operate using any type of sensor data, e.g., data generated by a strain gauge, a pressure gauge, a medical sensor, a chemical sensor, radar, ultrasound, and/or any other sensor type discussed herein. The Tendons 120 discussed herein may be substituted for other movement coupling components such as encoders, gears, cams, shafts, levers, belts, pullies, chains, and/or the like.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

I claim:
1. A robotic system comprising:
a movement generation device;
a robotic arm having a movement in a three-dimensional space responsive to the movement generation device;
an end effector coupled to the robotic arm and having a spatial pose adjustable, at least in part, by the movement of the robotic arm in the three-dimensional space;
one or more sensing devices configured to capture one or more images of a portion of an environment including the end effector; and
a neural network configured to output controls for the movement generation device in response to receiving images captured by the one or more sensing devices, wherein the neural network comprises a first processing block configured to estimate a position of an occluded object in an image of the portion of the environment and generate an image processing output that is representative of a state of a first object within the image and that includes the estimate of the position of the occluded object, wherein the first object is different from the occluded object.

2. The robotic system of claim 1, wherein the neural network retains a memory of the position of the occluded object within a state of the first processing block.

3. The robotic system of claim 2, wherein the first processing block comprises recurrent neural network layers having states dependent on previously processed images.

4. The robotic system of claim 1, wherein the neural network retains a memory of the position of the occluded object within an external memory communicatively coupled to the neural network.

5. The robotic system of claim 1, wherein the image processing output includes at least one of a representation of a distance between the end effector and the first object and a representation of a distance between two objects within the image.

6. The robotic system of claim 1, wherein the neural network comprises a second processing block configured to generate command signals for movement of the end effector based on at least one of a goal for the end effector, the image processing output, or a time dependent internal state of the second processing block.

7. The robotic system of claim 6, wherein the second processing block comprises recurrent neural network layers in which a state of the second processing block is changed through processing of the image processing output such that processing of the image processing output by the second processing block is dependent on prior states of the second processing block.

8. The robotic system of claim 7, wherein the third processing block comprises recurrent neural network layers in which a state of the third processing block is changed through processing of the image processing output and the command signal such that processing of the image processing output and the command signal is dependent on prior states of the third processing block.

9. The robotic system of claim 6, wherein the neural network comprises a third processing block configured to generate the control for the movement generation device based on the image processing output and the command signals.

10. The robotic system of claim 1, wherein the neural network comprises a multiple of the first processing block, and wherein each first processing block is configured to receive images from one of the one or more sensing devices.

11. A method of operating a robotic system, the method comprising:
receiving a first image of a portion of an environment including an end effector, wherein the end effector is coupled to a robotic arm that is responsive to a movement generation device;
generating a first image processing output representative of a state of a first object within the first image, wherein generating the image processing output comprises estimating a position of an occluded object in the first image, wherein the first image processing output includes the estimate of the position of the occluded object, and wherein the first object is different from the occluded object;
generating command signals for movement of the end effector; and
providing an output for control of the movement generation device based on the command signals and the image processing output, wherein providing the output causes the robotic arm to adjust at least one component of a spatial pose of the end effector.

12. The method of claim 11, wherein generating command signals for movement of the end effector comprises identifying one or more movement goals for the end effector based on the image processing output.

13. The method of claim 11, further comprising:
receiving a task for the end effector; and
identifying a first movement goal from the task;
wherein generating the command signals for the movement of the end effector comprises selecting a first processing block of a neural network configured to perform the first movement goal, and wherein selecting the first processing block causes the first processing block to generate the command signals.

14. The method of claim 11, wherein the image processing output is generated by a processing block of a neural network, and wherein generating the image processing output further comprises capturing a memory of the position of the occluded object in a state of the processing block.

15. The method of claim 11, wherein receiving the first image of the portion of the environment comprises receiving a plurality of images of the portion of the environment; and
wherein the image processing output is representative of states of objects within the plurality of images.

16. The method of claim 11, wherein the output for control of the movement generation device is provided by a neural network having recurrent nodes, and further comprising adjusting the output for hysteresis in positioning of the end effector based on the first image and the recurrent nodes of the neural network.

17. One or more non-transitory computer-readable storage media storing computer-executable instructions for causing a computing system to perform operations comprising:
receiving an image captured by one or more sensing devices configured to capture images of a portion of an environment including an end effector, wherein the end effector is coupled to a robotic arm;
generating, by a processing block of a neural network, an image processing output representative of a state of a first object within the image, wherein generating the image processing output comprises estimating a position of one or more occluded objects in the image, wherein the image processing output includes the estimate of the position of the one or more occluded objects, wherein the first object is different from the one or more occluded objects;
generating command signals for movement of the end effector based on a movement goal for the end effector; and
providing an output for control of a movement generation device coupled to the robotic arm based on the set of command signals and the set of image processing outputs, wherein the output causes the robotic arm to adjust at least one component of a spatial pose of the end effector.

18. The one or more non-transitory computer-readable storage media of claim 17, wherein the neural network includes recurrent layers, and wherein generating the image processing output further comprises capturing a memory of the position of the one or more occluded objects in a state of the neural network.

19. The one or more non-transitory computer-readable storage media of claim 17, wherein the output for control of the movement of the generation device is provided by a neural network having recurrent nodes, and wherein the operations further comprise adjusting the output for hysteresis in positioning of the end effector based on the image and the recurrent nodes of the neural network.

* * * * *